United States Patent
Shiragaki et al.

(10) Patent No.: US 9,133,346 B2
(45) Date of Patent: Sep. 15, 2015

(54) SURFACE-COATED ALUMINUM AND ZINC PLATED STEEL SHEET AND METHOD OF PREPARING SAME

(71) Applicants: NIPPON STEEL & SUMIKIN COATED SHEET CORPORATION, Tokyo (JP); NIPPON STEEL & SUMITOMO METAL CORPORATION, Tokyo (JP); NIHON PARKERIZING CO., LTD., Tokyo (JP)

(72) Inventors: Nobuki Shiragaki, Hyogo (JP); Tomokazu Sugitani, Osaka (JP); Hiroyuki Oyokawa, Chiba (JP); Satoru Yonetani, Osaka (JP); Hiroshi Kanai, Chiba (JP); Nobuyuki Shimoda, Tokyo (JP); Ichiro Oura, Kanagawa (JP); Hitoshi Kikuchi, Bangkok (TH)

(73) Assignees: NIPPON STEEL & SUMIKIN COATED SHEET CORPORATION, Tokyo (JP); NIPPON STEEL & SUMITOMO METAL CORPORATION, Tokyo (JP); NIHON PARKERIZING CO., LTD., Tokyo (JP)

( * ) Notice: Subject to any disclaimer, the term of this patent is extended or adjusted under 35 U.S.C. 154(b) by 0 days.

(21) Appl. No.: 14/381,203

(22) PCT Filed: Feb. 28, 2013

(86) PCT No.: PCT/JP2013/001203
§ 371 (c)(1),
(2) Date: Aug. 26, 2014

(87) PCT Pub. No.: WO2013/128928
PCT Pub. Date: Sep. 6, 2013

(65) Prior Publication Data
US 2015/0044498 A1   Feb. 12, 2015

(30) Foreign Application Priority Data

Feb. 28, 2012   (JP) ................... 2012-042026

(51) Int. Cl.
| | |
|---|---|
| *B32B 15/08* | (2006.01) |
| *B32B 15/09* | (2006.01) |
| *B32B 15/18* | (2006.01) |
| *B32B 15/20* | (2006.01) |
| *C09D 5/08* | (2006.01) |
| *B05D 3/00* | (2006.01) |
| *B05D 3/02* | (2006.01) |
| *C23C 28/00* | (2006.01) |
| *C23C 26/00* | (2006.01) |
| *B05D 1/36* | (2006.01) |

(Continued)

(52) U.S. Cl.
CPC .. *C09D 5/08* (2013.01); *B05D 1/36* (2013.01); *B05D 3/02* (2013.01); *B05D 3/0254* (2013.01); *B32B 15/08* (2013.01); *C09D 133/10* (2013.01); *C09D 133/12* (2013.01); *C09D 175/06* (2013.01); *C23C 26/00* (2013.01); *C23C 28/00* (2013.01); *C23C 30/00* (2013.01); *B05D 7/16* (2013.01); *B05D 7/51* (2013.01); *C09D 7/12* (2013.01); *Y10T 428/12569* (2015.01); *Y10T 428/12757* (2015.01); *Y10T 428/12799* (2015.01); *Y10T 428/12972* (2015.01); *Y10T 428/12979* (2015.01); *Y10T 428/2495* (2015.01); *Y10T 428/27* (2015.01)

(58) Field of Classification Search
CPC ........ B32B 15/04; B32B 15/08; B32B 15/09; B32B 15/18; B32B 15/20; B32B 15/095; C23C 26/00; C23C 28/00; C23C 28/34; C23C 30/00; Y10T 428/12799; Y10T 428/12757; Y10T 428/12972; Y10T 428/12979; Y10T 428/2495; Y10T 428/27
USPC .......... 428/626, 684, 685, 213, 653, 659, 219
See application file for complete search history.

(56) References Cited

U.S. PATENT DOCUMENTS

| | | | |
|---|---|---|---|
| 2005/0037228 A1 | 2/2005 | Ishizuka et al. | |
| 2009/0202859 A1* | 8/2009 | Kimata et al. | ................ 428/653 |
| 2009/0274926 A1 | 11/2009 | Okai et al. | |

FOREIGN PATENT DOCUMENTS

| | | |
|---|---|---|
| JP | 9-41193 A | 2/1997 |
| JP | 2001-335960 A | 12/2001 |

(Continued)

OTHER PUBLICATIONS

International Search Report for the Application No. PCT/JP2013/001203 mailed Jun. 4, 2013.

(Continued)

*Primary Examiner* — Michael E La Villa
(74) *Attorney, Agent, or Firm* — Cheng Law Group, PLLC

(57) ABSTRACT

A surface-coated aluminum and zinc plated steel sheet in accordance with the present invention includes: a plated steel sheet; a composite coating film formed by applying an aqueous surface treatment agent on the plated steel sheet and drying the aqueous surface treatment agent. The aqueous surface treatment agent contains a water dispersible resin (A), a cobalt compound (B), and water, and has a pH within a range of 7.5 to 10. The composite coating film contains the water dispersible resin (A) and the cobalt compound (B). A percentage by mass of the water dispersible resin (A) in the composite coating film is 90% or more. A mass of the composite coating film per one surface of the plated steel sheet falls within a range of 0.5 to 3.5 g/m².

8 Claims, No Drawings

(51) Int. Cl.
*C09D 133/10* (2006.01)
*C09D 133/12* (2006.01)
*C09D 175/06* (2006.01)
*C23C 30/00* (2006.01)
*C09D 7/12* (2006.01)
*B05D 7/16* (2006.01)
*B05D 7/00* (2006.01)

(56) References Cited

FOREIGN PATENT DOCUMENTS

| | | |
|---|---|---|
| JP | 2007-162098 A | 6/2007 |
| JP | 2007-270302 A | 10/2007 |
| JP | 2009-132952 A | 6/2009 |
| JP | 2012-177206 A | 9/2012 |
| WO | WO-93/05198 A1 | 3/1993 |

OTHER PUBLICATIONS

Notification of Reasons for Refusal for the Application No. 2013-530486 from Japan Patent Office mailed Nov. 19, 2013.

The First Office Action for the Application No. 201380011550.7 from The State Intellectual Property Office of the People's Republic of China dated Apr. 30, 2015.

Supplementary European Search Report for the Application No. EP 13 75 5755 dated Jul. 10, 2015.

\* cited by examiner

SURFACE-COATED ALUMINUM AND ZINC PLATED STEEL SHEET AND METHOD OF PREPARING SAME

TECHNICAL FIELD

The present invention relates to: surface-coated aluminum and zinc plated steel sheets with corrosion resistance, chemical resistance, blackening resistance, and formability; and methods of preparing the same.

BACKGROUND ART

To achieve desired purposes such as improving long-term corrosion resistance of a steel sheet, plating has been used since olden days. Such a plated steel sheet has a plating layer, and a representative example of composition of the plating layer is an alloy containing 1 to 75 mass % aluminum and zinc which accounts for most of the residue, and a minute amount of the third component such as Si, Mg, and Ce—La.

The conventional plated steel sheets are excellent in corrosion resistance. However, this only means that time to occurrence of red rust resulting from corrosion of a base steel sheet is long. If the surface of the plating is not subjected to any coating treatment, white rust or blackening may occur at a short time, and as a result excellent appearance of the plated steel sheet may be lost. In recent years, when the plated steel sheet is used as a building component, the surface of the plating layer is prone to tarnish over time due to acid rain.

Therefore, techniques involved in surface treatment to suppress blackening of the plated steel sheet have been proposed recently. In particular, many techniques of chromium-free treatment using a surface treatment agent free of hexavalent chromium have been used, and many of these techniques are disclosed.

For example, Patent document 1 discloses a chromium-free surface treated plated steel sheet. The chromium-free surface treated plated steel sheet includes a hot-dip Zn—Al based alloy plated steel sheet and a coating film formed on the hot-dip Zn—Al based alloy plated steel sheet. The melted Zn—Al based alloy plated steel sheet has a melted Zn—Al alloy plating layer containing 1.0% to 10% Al, 0.2% to 1.0% Mg, and 0.005% to 0.1% Ni. The coating film is made of a treatment composition containing: a specific titanium-containing aqueous solution; and a nickel compound and/or a cobalt compound; and a fluorine compound; and an aqueous organic resin, at predetermined ratios. Patent document 1 also discloses that the chromium-free surface treated plated steel sheet is excellent in corrosion resistance, blackening resistance, coating adhesion, and external appearance of the plate.

However, performance offered by the techniques disclosed in Patent document 1 is practically insufficient in corrosion resistance, blackening resistance, acid resistance, and formability in view of recent environmental circumstances, and sufficient techniques have not been obtained yet, actually.

CITATION LIST

Patent Document

Patent document 1: JP 2009-132952 A

SUMMARY OF INVENTION

Technical Problem

The present invention has been made in view of the above circumstances, and the object thereof is to provide: a surface-coated aluminum and zinc plated steel sheet excellent in corrosion resistance, acid resistance and blackening resistance, and yet free of chromium; and a method of preparing the same.

Solution to Problem

According to the first aspect of the present invention, there is provided a surface-coated aluminum and zinc plated steel sheet, including: a plated steel sheet; and a composite coating film formed by applying an aqueous surface treatment agent on the plated steel sheet and drying the aqueous surface treatment agent. The aqueous surface treatment agent contains a water dispersible resin (A), a cobalt compound (B), and water, and has a pH within a range of 7.5 to 10. The composite coating film contains the water dispersible resin (A) and the cobalt compound (B). A percentage by mass of the water dispersible resin (A) in the composite coating film is 90% or more. A mass of the composite coating film per one surface of the plated steel sheet falls within a range of 0.5 to 3.5 g/m$^2$.

Note that, the phrase that "a mass of the composite coating film per one surface of the plated steel sheet falls within a range of 0.5 to 3.5 g/m$^2$" means that the mass of the composite coating film on at least the first surface of the plated steel sheet having the opposite first and second surfaces falls within a range of 0.5 to 3.5 g/m$^2$. That is, the mass of the composite coating film on the first surface falls within a range of 0.5 to 3.5 g/m$^2$, or the mass of each of the composite coating films on the first surface and the second surface falls within a range of 0.5 to 3.5 g/m$^2$.

Accordingly, the corrosion resistance, the blackening resistance, the acid resistance, and the formability of the surface-coated aluminum and zinc plated steel sheet are each improved, and the composite coating film is not required to contain chromium. Therefore, the surface-coated aluminum and zinc plated steel sheet has a remarkably great environmental utility value and a remarkably great industrial value.

According to the second aspect of the present invention referring to the first aspect, there is provided a surface-coated aluminum and zinc plated steel sheet in which cobalt constituting the cobalt compound (B) is contained in a mass ratio of 1/100 to 1/10000 based on the water dispersible resin (A).

In this case, the blackening resistance and the formability of the surface-coated aluminum and zinc plated steel sheet are further improved.

According to the third aspect of the present invention referring to the first or second aspect, there is provided a surface-coated aluminum and zinc plated steel sheet in which the cobalt compound (B) includes at least one type of cobalt salts selected from a group comprising cobalt sulfate, cobalt chloride, and cobalt nitrate.

In this case, the blackening resistance of the surface-coated aluminum and zinc plated steel sheet is further improved.

According to the fourth aspect of the present invention referring to any one of the first to third aspect, there is provided a surface-coated aluminum and zinc plated steel sheet in which the water dispersible resin (A) contains at least one of a polyester polyurethane resin (aI) and an acrylic resin (aII). The polyester polyurethane resin has, in molecule, a structural unit derived from polyester polyol. The acrylic resin (aII) is a polymer having: a polymer unit derived from (meth)acrylic acid ester having an alicyclic structure or a glycidyl group; a polymer unit derived from α,β-ethylenically unsaturated carboxylic acid; and a polymer unit derived from (meth)acrylic acid ester not having an alicyclic structure and a glycidyl group.

In this case, the formability and the corrosion resistance of the surface-coated aluminum and zinc plated steel sheet are further improved.

According to the fifth aspect of the present invention referring to any one of the first to fourth aspect, there is provided a surface-coated aluminum and zinc plated steel sheet including a base coating film formed by applying an aqueous surface conditioner onto the plated steel sheet. The aqueous surface conditioner contains: a basic zirconium compound (C); a cobalt compound (D); and water. The aqueous surface conditioner has a pH within a range of 7.5 to 10. The base coating film contains the basic zirconium compound (C) and the cobalt compound (D). The composite coating film is formed on the base coating film. A mass of the base coating film per one surface of the plated steel sheet falls within a range of 0.05 to 0.8 g/m$^2$. A Zr mass conversion attached amount of the base coating film per one surface of the plated steel sheet falls within a range of 5 to 400 mg/m$^2$. A Co mass conversion attached amount of the base coating film per one surface of the plated steel sheet falls within a range of 1 to 20 mg/m$^2$. Note that, the Zr mass conversion attached amount refers to an amount of Zr atoms contained in the base coating film. Note that, the Co mass conversion attached amount refers to an amount of Co atoms contained in the base coating film.

In this case, the blackening resistance and the corrosion resistance of the surface-coated aluminum and zinc plated steel sheet are further improved.

According to the sixth aspect of the present invention referring to any one of the first to fifth aspect, there is provided a surface-coated aluminum and zinc plated steel sheet in which the plated steel sheet has a plating layer containing a set of zinc and aluminum or a set of zinc, aluminum, and magnesium. An aluminum content of the plating layer falls within a range of 1 to 75 mass %, and a magnesium content of the plating layer is more than 0 mass % but is not more than 6.0 mass %.

In this case, the corrosion resistance of the surface-coated aluminum and zinc plated steel sheet is further improved.

According to the seventh aspect of the present invention referring to the sixth aspect, there is provided a surface-coated aluminum and zinc plated steel sheet in which the plating layer contains at least one type of: more than 0 mass % but not more than 1 mass % Ni; and more than 0 mass % but not more than 1 mass % Cr. Note that, these percentages are based on the whole of the plating layer.

In this case, the corrosion resistance of the surface-coated aluminum and zinc plated steel sheet is further improved.

According to the eighth aspect of the present invention referring to the sixth or seventh aspect, there is provided a surface-coated aluminum and zinc plated steel sheet in which the plating layer contains at least one type of: more than 0 mass % but not more than 0.5 mass % Ca; more than 0 mass % but not more than 0.5 mass % Sr; more than 0 mass % but not more than 0.5 mass % Y; more than 0 mass % but not more than 0.5 mass % La; and more than 0 mass % but not more than 0.5 mass % Ce. Note that, these percentages are based on the whole of the plating layer.

In this case, improvement on the corrosion resistance of the surface-coated aluminum and zinc plated steel sheet or an effect of suppressing defects in the surface may be expected.

According to the ninth aspect of the present invention referring to any one of the sixth to eighth aspects, there is provided a surface-coated aluminum and zinc plated steel sheet in which the plating layer contains Si in a range of 0.1 to 10 mass % based on Al of the plating layer.

In this case, the mechanical processability of the surface-coated aluminum and zinc plated steel sheet and the corrosion resistance of part of the surface-coated aluminum and zinc plated steel sheet which has been mechanically processed are further improved.

According to the tenth aspect of the present invention, there is provided a method of preparing a surface-coated aluminum and zinc plated steel sheet including: preparing a plated steel sheet and an aqueous surface treatment agent, the aqueous surface treatment agent having a pH within a range of 7.5 to 10 and containing a water dispersible resin (A), a cobalt compound (B), and water; and applying the aqueous surface treatment agent onto the plated steel sheet and drying the aqueous surface treatment to form a composite coating film in which a percentage by mass of the water dispersible resin (A) is 90% or more so that a mass of the composite coating film per one surface of the plated steel sheet falls within a range of 0.5 to 3.5 g/m$^2$.

According to the eleventh aspect of the present invention referring to the tenth aspect, there is provided a method of preparing a surface-coated aluminum and zinc plated steel sheet further including: preparing an aqueous surface conditioner having a pH within a range of 7.5 to 10 and containing a basic zirconium compound (C), a cobalt compound (D), and water; applying the aqueous surface conditioner onto the plated steel sheet to form a base coating film containing the basic zirconium compound (C) and the cobalt compound (D) so that a mass of the base coating film per one surface of the plated steel sheet falls within a range of 0.05 to 0.8 g/m$^2$, a Zr mass conversion attached amount of the base coating film per one surface of the plated steel sheet falls within a range of 5 to 400 mg/m$^2$, and a Co mass conversion attached amount of the base coating film per one surface of the plated steel sheet falls within a range of 1 to 20 mg/m$^2$; and forming the composite coating film on the base coating film.

Advantageous Effects of Invention

According to the present invention, it is possible to obtain a surface-coated aluminum and zinc plated steel sheet remarkably excellent in corrosion resistance, chemical resistance, blackening resistance, and formability even by performing chromium-free treatment.

DESCRIPTION OF EMBODIMENTS

The surface-coated aluminum and zinc plated steel sheet (hereinafter, referred to as coated and plated steel sheet) of the present embodiment includes a plated steel sheet and a composite coating film on the plated steel sheet. Note that the composite coating film may be directly on and in contact with the plated steel sheet, or may be over the plated steel sheet with a further layer being interposed between the plated steel sheet and the composite coating film. The further layer may be a base coating film as described below.

The plated steel sheet includes a steel sheet and a plating layer formed on the plated steel sheet. The plating layer is formed by hot-dip plating process or the like.

The plating layer contains zinc and aluminum and preferably further contains magnesium, as constituent elements. When the plating layer contains zinc and aluminum, a thin oxide film generated in an aluminum phase in the plated layer constitutes the surface of the plating layer. Then, this oxide film shows a protection ability, and therefore corrosion resistance of the plating layer particularly in the surface thereof is improved. Furthermore, a sacrificial protection ability of zinc particularly suppresses occurrence of edge creeps on a cut edge of the coated and plated steel sheet. Therefore, remarkably high corrosion resistance is imparted to the coated and plated steel sheet. Besides, when the plating layer further contains magnesium which is a less noble metal than zinc, both of the protection ability of aluminum and the sacrificial protection ability of zinc in the plating layer are further enhanced, and therefore the corrosion resistance of the coated and plated steel sheet is further improved.

An aluminum content of the plating layer is not particularly limited, but preferably falls within a range of 1 to 75 mass %, and further preferably falls within a range of 5 to 65 mass %. The aluminum content particularly preferably falls within a range of 5 to 15 mass %. In this case where the aluminum content is 5 mass % or more, aluminum is first solidified in the formation of the plating layer. Therefore, the protection ability of the aluminum coating film is more likely to be shown. Besides, when the aluminum content is in the range of 5 to 15 mass %, the sacrificial protection ability of zinc is mainly shown, and furthermore the protection ability of aluminum is shown in the plating layer. Hence, the corrosion resistance of the coated and plated steel sheet is particularly improved. The aluminum content is preferably also in a range of 45 to 65 mass %. In this case, the protection ability of aluminum is mainly shown, and furthermore the sacrificial protection ability of zinc is shown in the plating layer. Hence, the corrosion resistance of the coated and plated steel sheet is particularly improved.

A magnesium content of the plating layer is not particularly limited, but preferably more than 0 mass % but is not more than 6.0 mass %, and particularly preferably in a range of 0.1 to 5.0 mass %.

The plating layer may further contain one or more type of elements selected from a group comprising of Si, Ni, Ce, Cr, Fe, Ca, Sr, and rare earths, as a constituent element.

When the plating layer contains one or more element selected from a group comprising Ni, Cr, Y, alkaline-earth elements (e.g., Ca and Sr), and rare earths (e.g., La and Ce), both of the protection ability of aluminum and the sacrificial protection ability of zinc in the plating layer are further enhanced, and therefore the corrosion resistance of the coated and plated steel sheet is further improved.

Particularly, the plating layer preferably contains at least one of Ni and Cr. When the plating layer contains Ni, it is preferable that an Ni content of the plating layer exceeds 0 mass % but is not more than 1 mass %. The Ni content more preferably falls within a range of 0.01 to 0.5 mass %. When the plating layer contains Cr, it is preferable that a Cr content of the plating layer exceeds 0 mass % but is not more than 1 mass %. The Cr content more preferably falls in a range of 0.01 to 0.5 mass %. In each of these cases, the corrosion resistance of the coated and plated steel sheet is particularly improved.

The plating layer also preferably contains one or more of Ca, Sr, Y, La and Ce. When the plating layer contains Ca, it is preferable that a Ca content of the plating layer exceeds 0 mass % but is not more than 0.5 mass %. The Ca content more preferably falls within a range of 0.001 to 0.1 mass %. When the plating layer contains Sr, it is preferable that an Sr content of the plating layer exceeds 0 mass % but is not more than 0.5 mass %. The Sr content falls more preferably in a range of 0.001 to 0.1 mass %. When the plating layer contains Y, it is preferable that a Y content of the plating layer exceeds 0 mass % but is not more than 0.5 mass %. The Y content more preferably falls within a range of 0.001 to 0.1 mass %. When the plating layer contains La, it is preferable that an La content of the plating layer exceeds 0 mass % but is not more than 0.5 mass %. The La content falls more preferably in a range of 0.001 to 0.1 mass %. When the plating layer contains Ce, it is preferable that a Ce content of the plating layer exceeds 0 mass % but is not more than 0.5 mass %. The Ce content falls more preferably in a range of 0.001 to 0.1 mass %. In each of these cases, the corrosion resistance of the coated and plated steel sheet is particularly improved, and an effect of suppressing defects on the surface of the plating layer is expected.

When the plating layer contains Si, the mechanical processability of the coated and plated steel sheet is improved. This is because Si suppresses growth of an alloy layer at an interface between the plating layer and the steel sheet, and therefore appropriate adhesion between the plating layer and the steel sheet is kept and formability is improved. Besides, Si is combined with magnesium to provide an alloy, and therefore the corrosion resistance of the coated and plated steel sheet is expected to be further improved. When the plating layer contains Si, Si is preferably in a range of 0.1 to 10 mass %, based on Al of the plating layer. In this case, the mechanical processability of the coated and plated steel sheet and the corrosion resistance of part of the coated and plated steel sheet which has been mechanically processed are further improved. This percentage of Si based on Al in the plating layer more preferably falls within a range of 1 to 5 mass %.

Of course, the plating layer may contain other elements which are unavoidably incorporated than the above mentioned elements.

The composite coating film contains a water dispersible resin (A) and a cobalt compound (B). The composite coating film is formed by applying an aqueous surface treatment agent onto the plated steel sheet and drying this agent. The aqueous surface treatment agent contains the water dispersible resin (A), the cobalt compound (B), and water, and has a pH within a range of 7.5 to 10.

The water dispersible resin (A) is described in further detail. Existence form of resin in water is roughly classified into two types of a water soluble form and a water dispersible form. Of these, a resin in the water dispersible form is used in the present embodiment. The resin in the water dispersible form refers to a resin which can form an emulsion or a dispersion as a result of being dispersed in water as particles.

The water dispersible resin (A) in the present embodiment is dispersed in the aqueous surface treatment agent as particles to form an emulsion or a dispersion. In the present embodiment, despite the cobalt compound (B) present in the aqueous surface treatment agent, the water dispersible resin (A) is stably present in the dispersed state. This may be because carboxyl groups of the particle of the water dispersible resin (A) are oriented to form the surface of the particle, and thus the particles of the water dispersible resin (A) are dispersed as ions, i.e., anions.

The water dispersible resin (A) preferably contains at least one of the following polyester polyurethane resin (aI) and acrylic resin (aII).

The polyester polyurethane resin (aI) is a polyester polyurethane resin having a structural unit derived from polyester polyol in molecule.

The acrylic resin (aII) is a polymer having; a polymer unit derived from (meth)acrylic acid ester having an alicyclic structure or a glycidyl group; a polymer unit derived from α,β-ethylenically unsaturated carboxylic acid; and a polymer unit derived from (meth)acrylic acid ester not having an alicyclic structure and a glycidyl group. The polyester polyurethane resin (aI) will be described. Examples of the starting material for the polyester polyurethane resin (aI) may include diisocyanate or polyisocyanate having two or more isocyanate groups, and diol or polyol, and diamine or polyamine, and an acid component and the like. The polyester polyurethane resin (aI) is prepared in a general synthetic method, and a method of preparing the polyester polyurethane resin (aI) is not particularly limited. For forming the polyester polyurethane resin (aI), at first, polyester polyol is prepared, and subsequently the polyester polyurethane resin (aI) is prepared from a material containing the resulting polyester polyol.

To obtain the polyester polyurethane resin (aI) with an affinity for water, dimethylol alkyl acid is preferably copolymerized with polyester polyol and hydrogenated isocyanate. In this case, the polyester polyurethane resin (aI) is self-emulsified to be hydrophilic (water dispersed). When the polyester polyurethane resin (aI) with the affinity for water is formed in this manner, the composite coating film is provided with excellent water resistance because no emulsifier is used in the process of giving the affinity for water. Hence, the corrosion resistance and the acid resistance of the coated and plated steel sheet are improved. Note that it is possible to use such an amount of an emulsifier that good storage stability of the aqueous surface treatment agent can be kept and other properties are not lowered.

The polyester polyol may be a polyester obtained by a dehydration condensation reaction involving a glycol component and an acid component such as polyvalent carboxylic acid, hydroxy carbonic acid, and derivatives thereof for ester formation. The polyester polyol may be a polyester obtained by ring-opening polymerization reaction of a cyclic ester compound such as ε-caprolactone. The polyester polyol may be copolymer of these polyesters.

Examples of the glycol component include ethylene glycol, propylene glycol, 1,3-propanediol, 1,4-butanediol, 1,5-pentanediol, 3-methyl-1,5-pentanediol, 1,6-hexanediol, neopentyl glycol, butyl ethyl propanediol, diethylene glycol, triethylene glycol, tetraethlyene glycol, polyethylene glycol (molecular weight: 300 to 6,000), dipropylene glycol, tripropylene glycol, bishydroxyethoxybenzene, 1,4-cyclohexane diol, 1,4-cyclohexanedimethanol, bisphenol A, hydrogenated bisphenol A, hydroquinone, and alkylene oxide adducts of these.

Examples of the acid component include succinic acid, adipic acid, azelaic acid, sebacic acid, dodecane dicarboxylic acid, maleic anhydride, fumaric acid, 1,3-cyclopentanedicarboxylic acid, 1,4-cyclohexane dicarboxylic acid, terephthalic acid, isophthalic acid, phthalic acid, 1,4-naphthalene dicarboxylic acid, 2,5-naphthalene dicarboxylic acid, 2,6-naphthalene dicarboxylic acid, naphthalic acid, biphenyl dicarboxylic acid, 1,2-bis(phenoxy) ethane-p,p'-dicarboxylic acid, anhydrides of these dicarboxylic acids, derivatives for ester formation of these dicarboxylic acids, p-hydroxy benzoic acid, and p-(2-hydroxyethoxy)benzoic acid.

Examples of the isocyanate include aliphatic, alicyclic, and aromatic polyisocyanates. Specific examples of the isocyanate include tetramethylene diisocyanate, hexamethylene diisocyanate, lysine diisocyanate ester, hydrogenated xylylene diisocyanate, 1,4-cyclohexylene diisocyanate, 4,4'-dicyclohexylmethane diisocyanate, 2,4'-dicyclohexyl methane diisocyanate, isophorone diisocyanate, 3,3'-dimethoxy-4,4'-biphenylene diisocyanate, 1,5-naphthalene diisocyanate, 1,5-tetrahydronaphthalene diisocyanate, 2,4-tolylene diisocyanate, 2,6-tolylene diisocyanate, 4,4'-diphenylmethane diisocyanate, 2,4'-diphenylmethane diisocyanate, phenylene diisocyanate, xylylene diisocyanate, and tetramethyl xylylene diisocyanate. Out of these, preferably used is an aliphatic or alicyclic polyisocyanate compound such as tetramethylene diisocyanate, hexamethylene diisocyanate, lysine diisocyanate ester, hydrogenated xylylene diisocyanate, 1,4-cyclohexylene diisocyanate, 4,4'-dicyclohexylmethane diisocyanate, 2,4'-dicyclohexylmethane diisocyanate, and isophorone diisocyanate. In this case, blackening (also yellowing) resistance of the composite coating film is improved in addition to the acid resistance and the corrosion resistance.

The polyester polyurethane resin (aI) may be mixed with an organic solvent to improve stability in synthesis of resin and a film forming property in low-temperature drying. Examples of the organic solvents include N-methyl-2-pyrrolidone, diethylene glycol monobutyl ether, and 2,2,4-trimethyl-1,3-pentanediol monoisobutylate.

Then, the acrylic resin (aII) will be described. In the present embodiment, using the acrylic resin (aII) improves slip resistance and weather resistance of the coated and plated steel sheet.

The acrylic resin (aII) is synthesized from starting materials of: (meth)acrylic acid ester having an alicyclic structure or a glycidyl group; α, β-ethylenically unsaturated carboxylic acid; and (meth)acrylic acid ester not having an alicyclic structure and a glycidyl group.

Examples of the (meth)acrylic acid ester having an alicyclic structure as the (meth)acrylic acid ester having an alicyclic structure or a glycidyl group include bornyl acrylate, isobornyl acrylate, bornyl methacrylate, isobornyl methacrylate, 1-adamantyl (meth)acrylate, 2-methyl-2-adamantyl (meth)acrylate, cyclooctyl (meth)acrylate, cyclodecyl (meth)acrylate, cyclododecyl (meth)acrylate. The (meth)acrylic acid ester having a glycidyl group may be glycidyl (meth)acrylate.

Examples of the α,β-ethylenically unsaturated carboxylic acid include acrylic acid, methacrylic acid, maleinic acid, and itaconic acid.

Examples of the (meth)acrylic acid ester not having an alicyclic structure and a glycidyl group include methyl (meth)acrylate, ethyl (meth)acrylate, propyl (meth)acrylate, isopropyl (meth)acrylate, butyl (meth)acrylate, isobutyl (meth)acrylate, n-butyl (meth)acrylate, t-butyl (meth)acrylate, hexyl (meth)acrylate, octyl (meth)acrylate, isooctyl (meth)acrylate, 2-ethylhexyl (meth)acrylate, 2-hydroxyethyl (meth)acrylate, decyl (meth)acrylate, 3-hydroxypropyl (meth)acrylate, cyclohexyl (meth)acrylate, and acrylonitrile.

The synthetic method of the acrylic acid (aII) is not particularly limited, but may be radical polymerization using an emulsifier and peroxide, for example. Examples of the emulsifier include: an anionic activating agent such as sodium salt of polyoxyethylene alkyl and sodium salt of alkyl benzene sulfonic acid; a nonionic activating agent such as polyoxyethylene alkyl phenyl ethers, polyoxyethylene alkyl esters, and sorbitan alkyl esters; and a reactive emulsifier having a hydrophobic group with a functional group capable of radical polymerization. One or more of these may be used.

The acrylic resin (aII) may be modified with silane by use of a silane coupling agent. In this case, types of silane coupling agents and an amount to be modified with the silane coupling agent are not particularly limited. Specific examples of the silane-coupling agent include vinyltrichlorosilane, vinyltris(2-methoxyethoxy)silane, vinyltriethoxysilane, vinyltrimethoxysilane, [3-(methacryloyloxy)propyl]trimethoxysilane, 2-(3,4-epoxycyclohexyl)ethyltrimethoxysilane, 3-glycidoxypropyltrimethoxysilane, 3-glycidoxypropyltriethoxysilane, 3-glycidoxypropylmethyldiethoxysilane, N-(2-aminoethyl)-3-aminopropyltrimethoxysilane, N-(2-aminoethyl)-3-aminopropylmethyldimethoxysilane, 3-aminopropyltrimethoxysilane, 3-aminopropyltriethoxysilane, N-phenyl-3-aminopropyltrimethoxysilane, 3-mercaptopropyltrimethoxysilane, 3-chloropropyltrimethoxysilane, and ureidopropyltriethoxysilane.

In both cases where the water dispersible resin (A) contains the polyester polyurethane resin (aI) but does not contain the acrylic resin (aII) and where the water dispersible resin (A) contains the acrylic resin (aII) but does not contain the polyester polyurethane resin (aI), the coated and plated steel sheet shows excellent blackening resistance. Note that, to further improve blackening resistance of the coated and plated steel sheet to adapt to severe environment, the water dispersible resin (A) preferably contains both of the polyester polyurethane resin (aI) and the acrylic resin (aII). The ratio of the polyester polyurethane resin (aI) to the acrylic resin (aII) in the water dispersible resin (A) is not particularly limited. However, the ratio (mass ratio) of the mass of the polyester polyurethane resin (aI) to the mass of the acrylic resin (aII) preferably falls within a range of 69/31 to 40/60, more preferably falls within a range of 60/40 to 45/55, and much more preferably falls within a range of 55/45 to 50/50. Unless the mass ratio is more than 69/31, good acid resistance of the composite coating film is kept. Unless the mass ratio is less than 40/60, good corrosion resistance, acid resistance, and formability of the composite coating film are kept.

The water dispersible resin (A) may further be mixed with an emulsifier to improve water dispersibility of the water dispersible resin (A) so long as the advantageous effect of the present invention is sufficiently shown.

The cobalt compound (B) will be described below in detail. Examples of the cobalt compound (B) include cobalt (II) nitrate, cobalt (II) sulfate, cobalt (II) acetate, cobalt (II) oxalate, cobalt (II) nitrate, cobalt (II) acetate, cobalt (III) oxalate, cobalt (IV) chloride, cobalt (III) oxide, and cobalt (IV) oxide. The cobalt compound (B) preferably includes at least one type of cobalt salts selected from a group comprising cobalt sulfate, cobalt chloride, and cobalt nitrate. In other words, the cobalt compound (B) preferably includes at least one type of cobalt (II) nitrate, cobalt (II) sulfate, and cobalt (II) chloride. The cobalt compound (B) more preferably includes cobalt (II) nitrate.

The percentage by mass of the water dispersible resin (A) in the composite coating film is 90% or more. Accordingly, the composite coating film is provided with good corrosion resistance, acid resistance, and formability, and the aqueous surface treatment agent is provided with good storage stability. The percentage by mass of the water dispersible resin (A) is more preferably 95% or more, and is much more preferably 98% or more. The composite coating film necessarily contains the cobalt compound (B), however, the cobalt compound (B) content of the composite coating film is preferably smaller in view of economic efficiency.

When the aqueous surface treatment agent contains the cobalt compound (B), the cobalt compound (B) is uniformly dispersed in the composite coating film made of the aqueous surface treatment agent. Some amount of the cobalt compound (B) react with a surface of the plating layer to reform the surface. Accordingly, the blackening resistance of the coated and plated steel sheet is improved. Besides, some amount of the cobalt compound (B) dispersed in the composite coating film is dispersed in hot and humid conditions. This suppresses a phenomenon that the surface of the plating layer is tarnished. Accordingly, the blackening resistance of the coated and plated steel sheet is practically kept over the long-term. Even when acidic liquid penetrates the composite coating film and reaches the surface of the plating layer, the cobalt compound (B) protects the surface of the plating layer and shows an effect of suppressing tarnish. When the coated and plated steel sheet is subjected to forming process, owing to the cobalt compound (B) present between the die and the plating layer, the plating layer is less likely to suffer damage such as galling, and therefore the surface of the plating layer is less likely to blacken.

The ratio of the cobalt compound (B) to the water dispersible resin (A) is not particularly limited, however, cobalt constituting the cobalt compound (B) is preferably contained in a mass ratio of 1/100 to 1/10000 based on the water dispersible resin (A). This ratio more preferably falls within a range of 1/500 to 1/5000. When the ratio is not more than 1/100, good storage stability of the aqueous surface treatment agent is kept. When the ratio is greater than 1/100, improvement of performance owing to the cobalt compound (B) is no longer obtained. Hence, in view of economic efficiency, it is not preferable that the ratio be greater than 1/100. When the ratio is not less than 1/10000, blackening resistance, acid resistance, and resistance to degradation in forming process are particularly improved. Hence, even when the plated steel sheet has a plating layer with a high aluminum content, an excellent effect is exhibited.

The aqueous surface treatment agent may further contain a plasticizer. Examples of the plasticizer include 2,2,4-trimethyl-1,3-pentanediol mono-isobutyrate, diethylene glycol monobutyl ether acetate, ethylene glycol monobutyl ether acetate, and benzyl alcohol.

The percentage of the plasticizer contained in the aqueous surface treatment agent preferably falls in a range of 15 to 30 mass % based on a solid mass content of the water dispersible resin (A), and more preferably in a range of 20 to 25 mass %. When the percentage is not less than 15 mass %, an effect of adding the plasticizer is sufficiently shown, and as a result, the aqueous surface treatment agent is provided with good film formation properties. Hence, good corrosion resistance and acid resistance of the composite coating film are kept. When the percentage is not more than 30 mass %, good storage stability of the aqueous surface treatment agent is kept.

As described above, the pH of the aqueous surface treatment agent falls within the range of 7.5 to 10. When the pH is less than 7.5, the storage stability of the aqueous surface treatment agent tends to decrease. When the pH exceeds 10, the passivation layer at the surface of the plated steel sheet is destroyed. Hence, performance inherent to the plating layer is greatly worsened.

The composite coating film is formed by applying the aqueous surface treatment agent on the plated steel sheet and drying the aqueous surface treatment agent. Examples of the application method for the aqueous surface treatment agent include roll-coating, spraying, dipping, the shower ringer method, and the air knife method. The method of drying the aqueous surface treatment agent may be natural drying, or forced drying using a heater such as an electric furnace, a hot air furnace, and an induction heating furnace.

The peak metal temperature of the plated steel sheet in drying the aqueous surface treatment agent may fall within a range of 60 to 180° C., and more preferably fall within a range of 80 to 150° C., and much more preferably fall within a range of 100 to 150° C.

The mass of the composite coating film on the plated steel sheet falls within a range of 0.5 to 3.5 g/m$^2$. The mass refers to a mass per one surface of the plated steel sheet. In other words, the plated steel sheet has a first face and a second face, and on at least first face of the plated steel sheet, the mass of the composite coating film falls within a range of 0.5 to 3.5 g/m$^2$. That is, the mass of the composite coating film on the first face falls within a range of 0.5 to 3.5 g/m$^2$. The mass of the composite coating film on the first face falls within a range of 0.5 to 3.5 g/m$^2$ and the mass of the composite coating film on the second face falls within a range of 0.5 to 3.5 g/m$^2$.

When the mass of the composite coating film per one surface is less than 0.5 g/m$^2$, an effect of the composite coating film is not sufficiently obtained, and therefore the coated and plated steel sheet does not show excellent corrosion resistance, acid resistance, formability. When the mass of the composite coating film per one surface is greater than 3.5 g/m$^2$, long drying time is required to prevent insufficient film formation. Besides, when the mass of the composite coating film per one surface is greater than 3.5 g/m$^2$, improvement on the performance is saturated. This may cause drops in productivity and economic efficiency.

Prior to formation of the composite coating film on the plated steel sheet, in order to clean the surface of the plating layer by removing oil and/or unwanted substances attached to the surface of the plating layer, the plated steel sheet may be washed. The cleaner for wash may be a known cleaner containing an inorganic component such as acidic component and an alkaline component, a chelating agent, and a surfactant. The pH of the cleaner may be in the alkaline range or in the acidic range so long as the coated and plated steel sheet can show sufficient performance.

Prior to the formation of the composite coating film, the surface of the plated steel sheet may get contact with an aqueous surface conditioner which contains a cobalt compound and has the pH in the acidic range in order to precipitate Co on the plated steel sheet. The pH of the aqueous surface conditioner may be in the alkaline range. Treatment method using the aqueous surface conditioner may be dipping or spraying. The Co attached amount through this surface treatment to the plated steel sheet preferably falls within a range of 0.5 to 15 mg/m$^2$. In other words, the Co mass conversion attached amount of a base coating film made of the aqueous surface conditioner per one surface of the plated steel sheet preferably falls within a range of 0.5 to 15 mg/m$^2$. With the Co mass conversion attached amount being within the range, treatment temperature and treatment time to precipitate Co are not particularly limited. The type of the cobalt compound for the surface treatment may be arbitrarily selected from the examples of the cobalt compound (B) contained in the composite coating film. The pH of the aqueous surface conditioner is adjusted by a known acid component such as sulfuric acid, hydrochloric acid, and nitric acid and/or a known alkaline component such as ammonium and sodium hydroxide. Since the aqueous surface treatment agent to form the composite coating film on the base coating film is alkaline (pH 7.5 to 10), the pH of the aqueous surface conditioner is preferably in the alkaline range rather than in the acidic range in view of the industrial process. It is particularly preferable that the pH of the aqueous surface conditioner is in the same range of 7.5 to 10 as the pH of the aqueous surface treatment agent to form the composite coating film. Owing to such a surface treatment, the blackening resistance of the coated and plated steel sheet is kept over further long term.

Prior to the formation of the composite coating film, the base coating film may be formed of the alkaline aqueous surface conditioner containing a basic zirconium compound (C), a cobalt compound (D), and water, on the plated steel sheet. Then, the composite coating film may be formed on the base coating film. The base coating film contains the basic zirconium compound (C) and the cobalt compound (D). In this case, the blackening resistance of the coated and plated steel sheet is kept over further long term. Besides, the base coating film contains the basic zirconium compound (C) in addition to the cobalt compound (D), not only the blackening resistance but also the corrosion resistance of the coated and plated steel sheet are kept over further long term. The reason therefor is assumed as follows.

The base coating film containing the basic zirconium compound (C) is made dense, and therefore the corrosion resistance of the coated and plated steel sheet may be improved. Further, the aqueous surface conditioner contacts and reacts with the surface of the plating layer, and the cobalt compound (D) in the matrix composed of the basic zirconium compound (C) in the base coating film is present (precipitated) close to the interface between the base coating film and the plating layer. Therefore, the cobalt compound (D) is not rapidly consumed even under environment in which otherwise blackening occurs. Accordingly, the coated and plated steel sheet may sustainably show the blackening resistance over the long term.

Besides, since the aqueous surface conditioner is alkaline as with the aqueous surface treatment agent to form the composite coating film, there is an advantage of process. When the plating layer contains magnesium, the magnesium is easily dissolved in an acidic solution, but the aqueous surface conditioner is alkaline. Therefore, the magnesium of the plating layer is less likely to be dissolved in the aqueous surface conditioner. Accordingly, the plating layer is less likely to suffer damage, and sufficiently exhibits the characteristics thereof. Consequently, the characteristics of the plating layer and the base coating film can be synergistically shown.

It is particularly preferable that the pH of the aqueous surface conditioner falls within a range of 7.5 to 10 as with the pH of the aqueous surface treatment agent. In this case, there is a distinct advantage of process. When the pH of the aqueous surface conditioner falls within the range of 7.5 to 10, storage stability of the aqueous surface conditioner and the stability of liquid used in treatment are improved. The pH of the aqueous surface conditioner is adjusted by a known acid component such as sulfuric acid, hydrochloric acid, and nitric acid and/or a known alkaline component such as ammonium, amines, and sodium hydroxide.

The basic zirconium compound (C) will be described below in detail. The basic zirconium compound (C) may include one or more compound selected from basic zirconium, a basic zirconyl compound, basic zirconium salt, zirconium basic carbonate, zirconyl basic carbonate, zirconium basic carbonate salt, and zirconyl basic carbonate salt. Types of salt may be ammonium salt, alkaline metal salt such as sodium salt, potassium salt, and lithium salt, or amine salt. Further specifically, the basic zirconium compound (C) may include one or more selected from: ammonium zirconium carbonate, namely, $(NH_4)_2ZrO(CO_3)_2$; potassium zirconium carbonate, namely, $K_2ZrO(CO_3)_2$; sodium zirconium carbonate, namely, $Na_2ZrO(CO_3)_2$; ammonium zirconium carbonate hydroxide, namely, $(NH_4)_2[Zr(CO_3)_2(OH)_2]$; potassium zirconium carbonate hydroxide, namely, $K_2[Zr(CO_3)_2(OH)_2]$; and sodium zirconium carbonate hydroxide, namely, $Na_2[Zr(CO_3)_2(OH)_2]$. In particular, the basic zirconium compound (C) preferably contain at least one of: ammonium zirconium carbonate, namely, $(NH_4)_2ZrO(CO_3)_2$; and ammonium zirconium carbonate hydroxide, namely, $(NH_4)_2[Zr(CO_3)_2(OH)_2]$.

The cobalt compound (D) will be described below in detail. Examples of the cobalt compound (D) include cobalt (II) nitrate, cobalt (II) sulfate, cobalt (II) acetate, cobalt (II) oxalate, cobalt (II) nitrate, cobalt (II) acetate, cobalt (III) oxalate, cobalt (IV) chloride, cobalt (III) oxide, and cobalt (IV) oxide. The cobalt compound (D) may include one or more of these compounds. The cobalt compound (D) preferably includes at least one type of cobalt salts selected from a group comprising cobalt sulfate, cobalt chloride, and cobalt nitrate. In other words, the cobalt compound (D) preferably includes at least one type of cobalt (II) nitrate, cobalt (II)

sulfate, and cobalt (II) chloride. The cobalt compound (D) more preferably includes cobalt (II) nitrate.

The aqueous surface conditioner is prepared by mixing the basic zirconium compound (C), and the cobalt compound (D), and water and further compounding as requested at least one of the acidic component and the alkaline component for the pH adjustment. The amounts of the basic zirconium compound (C) and the cobalt compound (D) contained in the aqueous surface conditioner are appropriately adjusted in view of the application property of the aqueous surface conditioner and in accordance with intended zirconium content and cobalt content of the base coating film and the like.

The base coating film is formed by applying the aqueous surface conditioner. Specifically, the application method for the base coating film may adopt reaction treatment or application treatment. In the reaction treatment, the aqueous surface conditioner is applied to the plating layer by immersing or spraying and then the plating layer is washed with water to form the base coating film. In this case, the temperature of the aqueous surface conditioner applied onto the plating layer falls preferably in a range of 10 to 80° C. In the application treatment, the aqueous surface conditioner is applied to the plating layer by roll coating, spraying, dipping, the shower ringer method, the air knife method, or the curtain flow method, and then dried without the plating layer being washed with water, and thus the base coating film is formed. In this case, the temperature of the aqueous surface conditioner applied onto the plating layer falls preferably in a range of 10 to 150° C., and more preferably falls within a range of 30 to 100° C. To increase a volume of the base coating film to improve the effect of the present invention, the application treatment is preferable.

It is preferable that the mass of the base coating film per one surface of the plated steel sheet falls within a range of 0.05 to 0.8 g/m². When the mass of the base coating film per one surface is not less than 0.05 g/m², the base coating film shows a remarkable effect of improving the blackening resistance and the corrosion resistance. When the mass of the base coating film per one surface is not more than 0.8 g/m², the base coating film is remarkably made dense, and thus the base coating film also shows a remarkable effect of improving the blackening resistance and the corrosion resistance.

It is preferable that the Zr mass conversion attached amount of the base coating film per one surface of the plated steel sheet falling within a range of 5 to 400 mg/m². In this case, the base coating film shows a remarkable effect of improving the blackening resistance and the corrosion resistance. It is preferable that the Co mass conversion attached amount of the base coating film per one surface of the plated steel sheet falling within a range of 1 to 20 mg/m². In this case, the base coating film shows a remarkable effect of improving the blackening resistance and the corrosion resistance.

Besides, when all of the mass, the Zr mass conversion attached amount, and the Co mass conversion attached amount of the base coating film per one surface of the plated steel sheet are individually within the above-mentioned preferable ranges, an effect owing to the two-layer structure of the composite coating film and the base coating film may be remarkably shown.

EXAMPLES

The present invention will be specifically described using Examples.

(1) Samples

Six types of plated steel sheets (No. 1 to No. 6) were prepared. Table 1 shows the compositions of the plating layers of the plated steel sheets. Values in this table indicate percentages by mass (mass %) of elements in the plating layer based on the whole of the plating layer. Note that values in the column "Si/Al" in the table indicate a percentage by mass (mass %) of Si in the plating layer based on Al in the plating layer.

TABLE 1

|  | Zn | Al | Mg | Si | (Si/Al) | Ni | Cr | Ca | Sr | Y | La | Ce |
|---|---|---|---|---|---|---|---|---|---|---|---|---|
| No.1 | The rest | 55 | — | 1.6 | 2.91 | — | — | — | — | — | — | — |
| No.2 | The rest | 11 | 3 | 0.2 | 1.818181818 | — | — | — | — | — | — | — |
| No.3 | The rest | 11 | 3 | 0.2 | 1.82 | 0.3 | — | — | — | — | — | — |
| No.4 | The rest | 55 | 2 | 1.6 | 2.91 | — | — | 0.02 | 0.002 | — | — | — |
| No.5 | The rest | 55 | 2 | 1.6 | 2.91 | — | 0.1 | 0.02 | 0.002 | — | — | — |
| No.6 | The rest | 58 | 2 | 2.5 | 4.31 | 0.5 | — | — | — | 0.01 | 0.005 | 0.08 |

(2) Pre-Treatment

Degreasing Treatment

The surface of the plated steel sheet was subjected to alkaline degreasing to be cleaned. For the alkaline degreasing, a silicate-based alkaline degreaser (available from Nihon Parkerizing Co., Ltd., product name: Palklin N364S) was adjusted to have a concentration of 2% and a temperature of 60° C., and was sprayed to the surface of the plated steel sheet for 10 seconds. Subsequently, the resultant surface of the plated steel sheet was washed with tap water, and then the plated steel sheet was drained off with a draining roll, and thereafter heated to be dried at 50° C. for 30 seconds.

(3) Aqueous Surface Treatment Agent (3-1) Water Dispersible Resin (A)

The urethane resins (aI) defined in Table 2 and the acrylic resins (aII) were prepared by the following synthetic methods.
(Urethane Resin (aI1))
Into a reactor, 100 parts by mass of polyester polyol having the number average molecular weight of 2000 synthesized from 1,6-hexanediol, neopentyl glycol, and adipic acid, 5 parts by mass of 2,2-dimethyl-1,3-propanediol, 20 parts by mass of 2,2-dimethylolpropionic acid, 100 parts by mass of 2,4-dicyclohexylmethanediisocyanate, and 100 parts by mass of N-methyl-2-pyrrolidone were added and reacted. Consequently, an urethane prepolymer having a free isocyanate group content of 5 mass % based on a non-volatile content thereof was obtained.

Subsequently, into a vessel, 16 parts by mass of ethylenediamine, 10 parts by mass of triethylamine, and 500 parts by mass of ion-exchanged water were added. Into the resultant mixture which was being mixed with a homomixer, the urethane prepolymer was further added to be emulsified. Consequently, a water dispersible urethane resin (aI1) having a non-volatile content of 35 mass % was obtained.

(Urethane Resin (aI2))

Into a reactor, 100 parts by mass of polyester polyol having the number average molecular weight of 2000 synthesized from 1,6-hexanediol, neopentyl glycol, and adipic acid, 5 parts by mass of 2,2-dimethyl-1,3-propanediol, 20 parts by mass of 2,2-dimethylolpropionic acid, 100 parts by mass of 4,4-dicyclohexylmethanediisocyanate, and 100 parts by mass of N-methyl-2-pyrrolidone were added and reacted. Consequently, an urethane prepolymer having a free isocyanate group content of 5 mass % based on a non-volatile content thereof was obtained.

Subsequently, into a vessel, 16 parts by mass of ethylenediamine, 10 parts by mass of triethylamine, and 500 parts by mass of ion-exchanged water were added. Into the resultant mixture which was being mixed with a homomixer, the urethane prepolymer was further added to be emulsified. Consequently, a water dispersible urethane resin (aI2) having a non-volatile content of 35 mass % was obtained.

(Urethane Resin (aI3))

Into a reactor, 100 parts by mass of polyester polyol having the number average molecular weight of 2000 synthesized from 1,6-hexanediol and adipic acid, 5 parts by mass of 2,2-dimethyl-1,3-propanediol, 20 parts by mass of 2,2-dimethylolpropionic acid, 100 parts by mass of 4,4-dicyclohexylmethanediisocyanate, and 100 parts by mass of N-methyl-2-pyrrolidone were added and reacted. Consequently, an urethane prepolymer having a free isocyanate group content of 5 mass % based on a non-volatile content thereof was obtained.

Subsequently, into a vessel, 16 parts by mass of ethylenediamine, 10 parts by mass of triethylamine, and 500 parts by mass of ion-exchanged water were added. Into the resultant mixture which was being mixed with a homomixer, the urethane prepolymer was further added to be emulsified. Consequently, a water dispersible urethane resin (aI3) having a non-volatile content of 35 mass % was obtained.

(Urethane Resin (aI4))

Into a reactor, 100 parts by mass of polyester polyol having the number average molecular weight of 2000 synthesized from 1,6-hexanediol, neopentyl glycol, and adipic acid, 5 parts by mass of 2,2-dimethyl-1,3-propanediol, 20 parts by mass of 2,2-dimethylolpropionic acid, 100 parts by mass of hexamethylenediisocyanate, and 100 parts by mass of N-methyl-2-pyrrolidone were added and reacted. Consequently, an urethane prepolymer having a free isocyanate group content of 5 mass % based on a non-volatile content thereof was obtained.

Subsequently, into a vessel, 16 parts by mass of ethylenediamine, 10 parts by mass of triethylamine, and 500 parts by mass of ion-exchanged water were added. Into the resultant mixture which was being mixed with a homomixer, the urethane prepolymer was further added to be emulsified. Consequently, a water dispersible urethane resin (aI4) having a non-volatile content of 35 mass % was obtained.

TABLE 2

| | Polyurethane resin | |
|---|---|---|
| | Skeleton of resin | Types of isocyanate |
| aI1 | polyester | alicyclic type |
| aI2 | polyester | alicyclic type |
| aI3 | polyester | alicyclic type |
| aI4 | polyester | aliphatic type |

(Acrylic Resins (aII1) to (aII11))

Into mixture of deionized water and polyoxyethylene octyl phenyl ether, compounds selected from acrylic acid, methacrylic acid, isobornyl acrylate, isobornyl methacrylate, 1-adamantyl methacrylate, 2-methyl-2-adamantyl methacrylate, glycidyl acrylate, glycidyl methacrylate, methyl methacrylate, propyl methacrylate, n-butyl methacrylate, t-butyl methacrylate, 2-ethylhexyl acrylate, 2-hydroxyethyl methacrylate, and 3-hydroxypropyl methacrylate were added in accordance with compositions (mass %) indicated by Tables 3 and 4. The resultant mixture was heated to 80 to 85° C. for several hours and reacted under a presence of ammonium persulfate as a polymerization catalyst. Thereafter, the pH and the concentration thereof were adjusted with ammonium water and deionized water to give a water dispersible acrylic resin having a solid concentration of 40%.

TABLE 3

| | | aII1 | aII2 | aII3 | aII4 | aII5 | aII6 |
|---|---|---|---|---|---|---|---|
| α,β-Ethylenically unsaturated carboxylic acid | Acrylic acid | 2.5 | | 2.5 | 2.5 | | 2.5 |
| | Methacrylic acid | | 2.5 | | | 2.5 | |
| Ester of (meth)acrylic acid having an alicyclic structure | Isobornyl acrylate | 10 | 10 | 10 | | 10 | 10 |
| | Isobornyl methacrylate | | | | 10 | | |
| | 1-Adamantyl methacrylate | | | | | | |
| | 2-Methyl-2-adamantyl methacrylate | | | | | | |
| Ester of (meth)acrylic acid having a glycidyl group | Glycidyl acrylate | | | | | | |
| | Glycidyl methacrylate | | | | | | |
| Ester of (meth)acrylic acid not having an alicyclic structure and a glycidyl group | Methyl methacrylate | 52 | 52 | | 52 | | 52 |
| | Propyl methacrylate | | | 52 | | 52 | |
| | n-Butyl methacrylate | 26 | 26 | 26 | 26 | 26 | |
| | t-Butyl methacrylate | | | | | | 26 |
| | 2-Ethylhexyl acrylate | 12 | 12 | 12 | 12 | 12 | 12 |
| | 2-Hydroxyethyl methacrylate | 2.5 | 2.5 | 2.5 | 2.5 | 2.5 | 2.5 |
| | 3-Hydroxypropyl methacrylate | | | | | | |
| | Acrylonitrile | | | | | | |

TABLE 4

| | | aII7 | aII8 | aII9 | aII10 | aII11 |
|---|---|---|---|---|---|---|
| α,β-Ethylenically unsaturated carboxylic acid | Acrylic acid | 2.5 | 2.5 | | 2 | |
| | Methacrylic acid | | | 2.5 | | 2 |

TABLE 4-continued

| | | aII7 | aII8 | aII9 | aII10 | aII11 |
|---|---|---|---|---|---|---|
| Ester of (meth)acrylic acid having an alicyclic structure | Isobornyl acrylate | | | | | |
| | Isobornyl methacrylate | 10 | | | | |
| | 1-Adamantyl methacrylate | | 10 | | | |
| | 2-Methyl-2-adamantyl methacrylate | | | 10 | | |
| Ester of (meth)acrylic acid having a glycidyl group | Glycidyl acrylate | | | | | 9.6 |
| | Glycidyl methacrylate | | | | 9.6 | |
| Ester of (meth)acrylic acid not having an alicyclic structure and a glycidyl group | Methyl methacrylate | 52 | | 52 | 45 | 45 |
| | Propyl methacrylate | | 52 | | | |
| | n-Butyl methacrylate | 26 | | 26 | 45.4 | 21.6 |
| | t-Butyl methacrylate | | 26 | | | |
| | 2-Ethylhexyl acrylate | 12 | 12 | 12 | | |
| | 2-Hydroxyethyl methacrylate | | | | 2.5 | 2.5 |
| | 3-Hydroxypropyl methacrylate | 2.5 | | | | |
| | Acrylonitrile | | | | | 23.8 |

(3-2) Cobalt Compound (B)

As the cobalt compound (B), compounds (b1) to (b4) in the following Table 5 were used.

TABLE 5

| | Cobalt compound |
|---|---|
| b1 | Cobalt (II) nitrate |
| b2 | Cobalt (II) sulfate |
| b3 | Cobalt (II) chloride |
| b4 | Cobalt (II) acetylacetonate |

(3-3) Preparation of the Aqueous Surface Treatment Agent

Examples 1 to 41 and Comparative Examples 1 to 5

The water dispersible resin (A), the cobalt compound (B), and deionized water were compounded, and ammonia or ammonium nitrate was further added thereto as requested for pH adjustment. Consequently, the surface treatment agent (aqueous surface treatment agent) having a solid concentration of 30% was obtained.

Tables 6 and 7 show types and compounded percentages of the water dispersible resin (A) and cobalt compound (B) used in Examples and Comparative Examples as well as the pH of the resultant aqueous surface treatment agent. Note that, in Tables 6 and 7, "(aI)/(aII)" shows a mass ratio of the urethane resin (aI) to the acrylic resin (aII), "Co/(a) mass ratio" shows a mass ratio of cobalt constituting the cobalt compound (B) to the water dispersible resin (A), and "(A)/((A)+(B)) (mass %)" shows a mass percentage of the water dispersible resin (A) to the total amount of the water dispersible resin (A) and the cobalt compound (B).

TABLE 6

| | | Aqueous surface treatment agent | | | | | | |
|---|---|---|---|---|---|---|---|---|
| | | Water dispersible resin (A) | | | Cobalt | Component ratio | | |
| | | (aI) Type | (aII) Type | Resin ratio (aI)/(aII) | compound (B) Type | Co/(a) mass ratio | (A)/((A) + (B)) mass (%) | pH |
| Examples | 1 | aI1 | — | — | b1 | 1/1500 | 99.8 | 8 |
| | 2 | aI2 | — | — | b2 | 1/1500 | 99.8 | 8 |
| | 3 | aI3 | — | — | b3 | 1/1500 | 99.8 | 8 |
| | 4 | aI4 | — | — | b4 | 1/1500 | 99.8 | 8 |
| | 5 | — | aII1 | — | b1 | 1/1500 | 99.8 | 8 |
| | 6 | — | aII2 | — | b2 | 1/1500 | 99.8 | 8 |
| | 7 | — | aII3 | — | b3 | 1/1500 | 99.8 | 8 |
| | 8 | — | aII4 | — | b4 | 1/1500 | 99.8 | 8 |
| | 9 | — | aII5 | — | b1 | 1/1500 | 99.8 | 8 |
| | 10 | — | aII6 | — | b2 | 1/1500 | 99.8 | 8 |
| | 11 | — | aII7 | — | b3 | 1/1500 | 99.8 | 8 |
| | 12 | — | aII8 | — | b4 | 1/1500 | 99.8 | 8 |
| | 13 | — | aII9 | — | b1 | 1/1500 | 99.8 | 8 |
| | 14 | — | aII10 | — | b2 | 1/1500 | 99.8 | 8 |
| | 15 | — | aII11 | — | b3 | 1/1500 | 99.8 | 8 |
| | 16 | aI1 | aII1 | 1 | b1 | 1/1500 | 99.8 | 8 |
| | 17 | aI1 | aII1 | 1 | b1 | 1/150 | 97.9 | 8 |
| | 18 | aI1 | aII1 | 1 | b1 | 1/60 | 95.0 | 8 |
| | 19 | aI1 | aII1 | 1 | b1 | 1/28 | 90.0 | 8 |
| | 20 | aI1 | aII1 | 1 | b1 | 1/5000 | 99.9 | 8 |
| | 21 | aI1 | aII1 | 0.7 | b1 | 1/1500 | 99.8 | 8 |
| | 22 | aI1 | aII1 | 1.4 | b1 | 1/1500 | 99.8 | 8 |
| | 23 | aI1 | aII1 | 2.1 | b1 | 1/1500 | 99.8 | 8 |

TABLE 7

| | | Aqueous surface treatment agent | | | | | | |
|---|---|---|---|---|---|---|---|---|
| | | Water dispersible resin (A) | | | Cobalt | Component ratio | | |
| | | (aI) Type | (aII) Type | Resin ratio (aI)/(aII) | compound (B) Type | Co/(a) mass ratio | (A)/ ((A) + (B)) (mass %) | pH |
| Examples | 24 | aI1 | aII1 | 1 | b1 | 1/1500 | 99.8 | 8 |
| | 25 | aI1 | aII1 | 1 | b1 | 1/1500 | 99.8 | 8 |
| | 26 | aI1 | aII1 | 1 | b1 | 1/1500 | 99.8 | 9.5 |
| | 27 | aI1 | aII1 | 1 | b1 | 1/1500 | 99.8 | 7.7 |
| | 28 | aI1 | aII1 | 1 | b1 | 1/1500 | 99.8 | 8 |
| | 29 | aI1 | aII1 | 1 | b1 | 1/1500 | 99.8 | 8 |
| | 30 | aI1 | aII1 | 1 | b1 | 1/1500 | 99.8 | 8 |
| | 31 | aI1 | aII1 | 1 | b1 | 1/1500 | 99.8 | 8 |
| | 32 | aI1 | aII1 | 1 | b1 | 1/1500 | 99.8 | 8 |
| | 33 | aI1 | aII1 | 1 | b1 | 1/1500 | 99.8 | 8 |
| | 34 | aI1 | aII1 | 1 | b1 | 1/1500 | 99.8 | 8 |
| | 35 | aI1 | aII1 | 1 | b1 | 1/1500 | 99.8 | 8 |
| | 36 | aI1 | aII1 | 1 | b1 | 1/1500 | 99.8 | 8 |
| | 37 | aI1 | aII1 | 1 | b1 | 1/1500 | 99.8 | 8 |
| | 38 | aI1 | aII1 | 1 | b1 | 1/1500 | 99.8 | 8 |
| | 39 | aI1 | aII1 | 1 | b1 | 1/1500 | 99.8 | 8 |
| | 40 | aI1 | aII1 | 1 | b1 | 1/1500 | 99.8 | 8 |
| | 41 | aI1 | aII1 | 1 | b1 | 1/1500 | 99.8 | 8 |
| Comparative Examples | 1 | aI1 | aII1 | 1 | — | — | — | 8 |
| | 2 | — | — | — | b1 | — | — | 8 |
| | 3 | aI1 | aII1 | 1 | b1 | 1/7 | 69.0 | 8 |
| | 4 | aI1 | aII1 | 1 | b1 | 1/1500 | 99.8 | 8 |

(3-4) Preparation of Aqueous Surface Treatment Agent

Comparative Example 5

An aqueous surface treatment agent was prepared by compounding 25 parts by mass of aqueous titanium-containing liquid prepared by the following manner, 54.6 parts by mass of a water dispersible acrylic resin prepared by the following manner, 0.4 parts by mass of cobalt nitrate, and 20 parts by mass of ammonium hexaflorozirconate.

Aqueous Titanium-Containing Liquid

A mixture of 10 parts by mass of titanium tetraisopropoxide and 10 parts by mass of isopropanol was dropped at 20° C. over 1 hour into a further mixture of 10 parts by mass of 30 mass % hydrogen peroxide solution and 100 parts by mass of deionized water with the further mixture being mixed. Thereafter, the resultant mixture was aged at 25° C. for 2 hours. Consequently, a yellow transparent and little sticky aqueous titanium-containing liquid was obtained.

Water Dispersible Acrylic Resin

A reflux condenser, a stirrer, a thermometer, and a dropping funnel were set to a four-necked flask with a capacity of 2 L. Into the four-necked flask, 665 parts by mass of deionized water, 9 parts by mass of AQUARON RN-50 (available from DAI-ICHI KOGYO SEIYAKU CO., LTD., non-ionic emulsifier, solid content of 60 mass %), 87 parts by mass of AQUARON RN-2025 (from DAI-ICHI KOGYO SEIYAKU CO., LTD., non-ionic emulsifier, solid content of 25 mass %), and 5 mass % of pre-emulsion (28.9 parts by mass) obtained by forcibly emulsifying a monomer mixture No. 1 (for a first step). The resultant mixture was heated after conducting a replacement of nitrogen. The composition of the monomer mixture No. 1 is shown below.

When the temperature of the mixture becomes 55° C. or more, 5 mass % of an aqueous reducing agent solution (4.3 parts by mass) was added into the mixture. Note that, the aqueous reducing agent solution was prepared by dissolving 5 mass % of an aqueous oxidant solution (4.43 parts by mass) and 2.5 parts by mass of sodium formaldehyde sulfoxylate into the 83.5 parts by mass of deionized water. The aqueous oxidant solution was prepared by dissolving 5 parts by mass of perbutyl H (t-butyl hydroperoxide, active ingredient of 69 mass %) into 83.5 parts by mass of deionized water.

Subsequently, this resulting mixture was further heated to 60° C., and held at this temperature.

After a lapse of 15 minutes from the addition of the aqueous reducing agent solution, the rest of the pre-emulsion, the rest of the aqueous oxidant solution, and the rest of the aqueous reducing agent solution, were dropped over 1.5 hours, 3.5 hours, and 3.5 hours, respectively. While dropping the aqueous oxidant solution and the aqueous reducing agent solution and after a lapse of 1 hour from completion of dropping the first pre-emulsion, the monomer mixture No. 2 (for a second step) having a composition indicated below was dropped over 1 hour.

After completion of dropping all solutions, the resultant mixture was held at 60° C. for 1 hour. Thereafter, the temperature of the mixture was decreased to 40° C. or less. Subsequently, into the cooled mixture, 3.35 parts by mass of 25% ammonia water, 0.35 parts by mass of an antiseptic agent (product name: SLAOFF EX available from Japan Enviro-Chemicals. ltd), 83.5 parts by mass of 2,2,4-trimethyl-1,3-pentanediol monoisobutylate were added. Consequently, a water dispersible acrylic resin having the pH of 8.0 and the nonvolatile content (solid content) of 31 mass % was obtained.

Composition of the Monomer Mixture No. 1

Deionized water: 166.5 parts by mass
AQUARON RN-50: 6.6 parts by mass

AQUARON RN-2025: 53 parts by mass
Styrene: 35 parts by mass
Methyl methacrylate: 163.5 parts by mass
2-Ethylhexyl acrylate: 105 parts by mass
2-Hydroxyethyl methacrylate: 5 parts by mass
Methacrylic acid: 3 parts by mass
Acrylonitrile: 38.5 parts by mass
Tertiary dodecanethiol: 1 parts by mass Composition of the Monomer Mixture No. 2

Styrene: 15 parts by mass
Methyl methacrylate: 84.5 parts by mass
2-Ethylhexyl acrylate: 22.5 parts by mass
2-Hydroxyethyl methacrylate: 4.25 parts by mass
Methacrylic acid: 6 parts by mass
Acrylonitrile: 15 parts by mass
γ-methacryloxypropyltrimethoxysilane: 2.75 parts by mass (4) Aqueous Surface Conditioner (4-1) Basic Zirconium Compound (C)

As the basic zirconium compound (C), compounds (c1) to (c3) shown in the following Table 8 were used.

TABLE 8

| | Basic zirconium compound |
|---|---|
| c1 | Ammonium zirconium carbonate |
| c2 | Potassium zirconium carbonate |
| c3 | Diethanolamine salt of zirconium carbonate |

(4-2) Cobalt Compound (D)

As the cobalt compound (D), compounds (d1) to (d4) shown in the following Table 9 were used.

TABLE 9

| | Cobalt compound |
|---|---|
| d1 | Cobalt (II) nitrate |
| d2 | Cobalt (II) sulfate |
| d3 | Cobalt (II) chloride |
| d4 | Cobalt (II) acetylacetonate |

(4-3) Preparation of Aqueous Surface Conditioner

Examples 33 to 41

An aqueous surface conditioner was obtained by compounding the basic zirconium compound (C), the cobalt compound (D), and deionized water and further adding ammonia or ammonium nitrate thereto as requested for pH adjustment. The following Table 10 shows types of basic zirconium compound (C) and cobalt compound (D) for the aqueous surface conditioner as well as the pH of the aqueous surface conditioner.

TABLE 10

| | | Aqueous surface conditioner | | |
|---|---|---|---|---|
| | | Type of zirconium compound (C) | Type of cobalt compound (D) | pH |
| Examples | 33 | c1 | d1 | 9 |
| | 34 | c2 | d2 | 8 |
| | 35 | c3 | d4 | 10 |
| | 36 | c1 | d1 | 9 |
| | 37 | c2 | d1 | 8 |
| | 38 | c3 | d4 | 10 |
| | 39 | c1 | d1 | 8 |
| | 40 | c1 | d1 | 9 |
| | 41 | c1 | d1 | 8 |

(5) Preparation of Coated and Plated Steel Sheet

The aqueous surface treatment agents obtained in Examples and Comparative Examples were applied onto plated steel sheets shown in Tables 11 and 12 with a bar-coater. An attached amount of the aqueous surface treatment agent was adjusted by selecting a type of bar-coater. Subsequently, the resultant plated steel sheets were heated to the Peak Metal Temperatures (PMT) shown in Tables 11 and 12 under conditions at 280° C., thereby dried. Accordingly, coating films having masses shown in Tables 11 and 12 were obtained. Consequently, the coated and plated steel sheets were obtained.

Note that in each of Examples 33 to 41, prior to process using the aqueous surface treatment agent, the aqueous surface conditioner was applied onto the plated steel sheet. Subsequently, the resultant plated steel sheet was heated to the Peak Metal Temperature (PMT) shown in Table 12 under conditions at 200° C., thereby dried. Accordingly, a base coating film having a mass shown in Table 12 was obtained. Thereafter, the composite coating film was formed on the base coating film.

TABLE 11

| | | | Conditions for formation of base coating film | | | | Conditions for formation of composite coating film | |
|---|---|---|---|---|---|---|---|---|
| | | Type of plated steel sheet | PMT (° C.) | mass after drying (g/m$^2$) | Co mass conversion attached amount(mg/m$^2$) | Zr mass conversion attached amount(mg/m$^2$) | PMT (° C.) | mass after drying (g/m$^2$) |
| Examples | 1 | No.1 | — | — | — | — | 100 | 1.5 |
| | 2 | No.1 | — | — | — | — | 100 | 1.5 |
| | 3 | No.1 | — | — | — | — | 100 | 1.5 |
| | 4 | No.1 | — | — | — | — | 100 | 1.5 |
| | 5 | No.1 | — | — | — | — | 100 | 1.5 |
| | 6 | No.1 | — | — | — | — | 100 | 1.5 |
| | 7 | No.1 | — | — | — | — | 100 | 1.5 |
| | 8 | No.1 | — | — | — | — | 100 | 1.5 |

TABLE 11-continued

| | | Conditions for formation of base coating film | | | | Conditions for formation of composite coating film | |
|---|---|---|---|---|---|---|---|
| | Type of plated steel sheet | PMT (° C.) | mass after drying (g/m$^2$) | Co mass conversion attached amount(mg/m$^2$) | Zr mass conversion attached amount(mg/m$^2$) | PMT (° C.) | mass after drying (g/m$^2$) |
| 9 | No.1 | — | — | — | — | 100 | 1.5 |
| 10 | No.1 | — | — | — | — | 100 | 1.5 |
| 11 | No.1 | — | — | — | — | 100 | 1.5 |
| 12 | No.1 | — | — | — | — | 100 | 1.5 |
| 13 | No.1 | — | — | — | — | 100 | 1.5 |
| 14 | No.1 | — | — | — | — | 100 | 1.5 |
| 15 | No.1 | — | — | — | — | 100 | 1.5 |
| 16 | No.1 | — | — | — | — | 100 | 1.5 |
| 17 | No.1 | — | — | — | — | 100 | 1.5 |
| 18 | No.1 | — | — | — | — | 100 | 1.5 |
| 19 | No.1 | — | — | — | — | 100 | 1.5 |
| 20 | No.1 | — | — | — | — | 100 | 1.5 |
| 21 | No.1 | — | — | — | — | 100 | 1.5 |
| 22 | No.1 | — | — | — | — | 100 | 1.5 |
| 23 | No.1 | — | — | — | — | 100 | 1.5 |

TABLE 12

| | | | Conditions for formation of base coating film | | | | Conditions for formation of composite coating film | |
|---|---|---|---|---|---|---|---|---|
| | | Type of plated steel sheet | PMT (° C.) | mass after drying (g/m$^2$) | Co mass conversion attached amount (mg/m$^2$) | Zr mass conversion attached amount (mg/m$^2$) | PMT (° C.) | mass after drying (g/m$^2$) |
| Examples | 24 | No.1 | — | — | — | — | 100 | 0.8 |
| | 25 | No.1 | — | — | — | — | 100 | 3.0 |
| | 26 | No.1 | — | — | — | — | 100 | 1.5 |
| | 27 | No.1 | — | — | — | — | 100 | 1.5 |
| | 28 | No.2 | — | — | — | — | 100 | 1.5 |
| | 29 | No.3 | — | — | — | — | 100 | 1.5 |
| | 30 | No.4 | — | — | — | — | 100 | 1.5 |
| | 31 | No.5 | — | — | — | — | 100 | 1.5 |
| | 32 | No.6 | — | — | — | — | 100 | 1.5 |
| | 33 | No.4 | 60 | 0.2 | 4 | 90 | 100 | 1.5 |
| | 34 | No.5 | 60 | 0.4 | 10 | 120 | 100 | 1.5 |
| | 35 | No.6 | 60 | 0.1 | 1 | 50 | 100 | 1.5 |
| | 36 | No.1 | 60 | 0.05 | 1 | 30 | 100 | 1.5 |
| | 37 | No.1 | 100 | 0.4 | 5 | 120 | 100 | 1.5 |
| | 38 | No.1 | 60 | 0.1 | 1 | 50 | 100 | 1.5 |
| | 39 | No.4 | 60 | 0.3 | 5 | 100 | 100 | 1.5 |
| | 40 | No.5 | 60 | 0.4 | 7 | 150 | 100 | 1.5 |
| | 41 | No.6 | 60 | 0.1 | 4 | 200 | 100 | 1.5 |
| Comparative Examples | 1 | No.1 | — | — | — | — | 100 | 1.5 |
| | 2 | No.1 | — | — | — | — | 100 | 0.1 |
| | 3 | No.1 | — | — | — | — | 100 | 1.5 |
| | 4 | No.1 | — | — | — | — | 100 | 0.3 |
| | 5 | No.1 | — | — | — | — | 100 | 1.5 |

(6) Evaluation Test (6-1) Evaluation of Corrosion Resistance (1)

Regarding the coated and plated steel sheets, a salt spray test in compliance with the salt spray test method (JIS-Z-2371) was conducted for 120 hours. Thereafter, a percentage of a white rust occurrence area based on the coated and plated steel sheet was visually examined and rated according to the following evaluation criteria. Note that, in the test, the coated and plated steel sheet ranked as any one of 3 to 5 is judged to show practical excellent corrosion resistance.

5: White rust occurrence area percentage is less than 1%
4: White rust occurrence area percentage is 1% or more but less than 3%
3: White rust occurrence area percentage is 3% or more but less than 10%
2: White rust occurrence area percentage is 10% or more but less than 30%
1: White rust occurrence area percentage is 30% or more.

(6-2) Evaluation of Corrosion Resistance (2)

Evaluation of corrosion resistance (2) was different from "Evaluation of corrosion resistance (1)" in that time for salt spraying was 240 hours. Except for that, the salt spray test was conducted under the same conditions and the results were evaluated in the same manner as "evaluation of corrosion resistance (1)". Note that, in the test, the coated and plated steel sheet ranked as any one of 3 to 5 is judged to show practical excellent long-term corrosion resistance.

(6-3) Evaluation of Acid Resistance

The coated and plated steel sheet was immersed into 1% aqueous sulfuric acid solution at 25° C. for 5 hours, then washed with deionized water, and thereafter dried with a drier. After this treatment, a percentage of an area in which tarnish into black or brown occurred of the coated and plated steel sheet was visually examined. The results were rated in the following evaluation criteria.
4: Tarnish occurrence area percentage is less than 3%
3: Tarnish occurrence area percentage is 3% or more but less than 10%
2: Tarnish occurrence area percentage is 10% or more but less than 30%
1: Tarnish occurrence area percentage is 30% or more.

(6-4) Evaluation of Blackening Resistance (1)

The coated and plated steel sheets with dimensions of 150 mm×70 mm were stacked and exposed under constant temperature and humidity atmosphere at 50° C. and relative humidity of 98% for 7 days.

Regarding the coated and plated steel sheets before and after this treatment, color measurement was conducted under L*a*b* color system (JISZ8729). The color measurement was performed using a colorimeter spectroscopy (Model number: SC-T45) available from Suga Test Instruments Co., Ltd.

Based on these results, color difference between the coated and plated steel sheets before and after this treatment was calculated according to JISZ8730 using the following equations.

$$\Delta E=\{(\Delta L^*)^2+(\Delta a^*)^2+(\Delta b^*)^2\}^{1/2}$$

$$\Delta L^*=L1^*-L2^*, \Delta a^*=a1^*-a2^*, \Delta b^*=b1^*-b2^*$$

Note that $\Delta E$ is the color difference between the coated and plated steel sheets before and after the treatment. $L1^*$, $a1^*$, and $b1^*$ are values in $L^*$, $a^*$, and $b^*$ axes regarding the coated and plated steel sheet before the treatment, and $L2^*$, $a2^*$, and $b2^*$ are values in $L^*$, $a^*$, and $b^*$ axes regarding the coated and plated steel sheet after the treatment.

Based on these result, the blackening resistance was rated as follows. Note that, in the test, the coated and plated steel sheet which is ranked as any one of 3 to 5 is judged to show excellent practical blackening resistance.
5: $\Delta E$ is less than 2
4: $\Delta E$ is 2 or more but less than 5
3: $\Delta E$ is 5 or more but less than 10
2: $\Delta E$ is 10 or more but less than 15
1: $\Delta E$ is 15 or more

(6-5) Evaluation of Blackening Resistance (2)

Evaluation of blackening resistance (2) was different from "Evaluation of blackening resistance (1)" in that the exposure period under constant temperature and humidity atmosphere was 14 days. Except for that, the color measurement was conducted under the same conditions and the results were evaluated in the same manner as "Evaluation of blackening resistance (1)". Note that, in the test, the coated and plated steel sheet ranked as any one of 3 to 5 is judged to show practical excellent long-term blackening resistance.

(6-6) Evaluation of Formability

The test in which a bead having a tip with 5 mmR was pressed against the surface of the coated and plated steel sheet with the force of 200 kgf (1961 N) and the coated and plated steel sheet was drawn upward with being pressed by the bead was conducted. After this test, a percentage of an area in which tarnish into black occurred of the coated and plated steel sheet was visually examined. The results were rated in the following evaluation criteria. Note that, in the test, the coated and plated steel sheet which is ranked as 3 or 4 is judged to show practical excellent formability.
4: The coated and plated steel sheet is not changed
3: Tarnish occurrence area percentage is less than 3%
2: Tarnish occurrence area percentage is 3% or more but less than 30%
1: Tarnish occurrence area percentage is 30% or more.

(6-7) Blackening Resistance after Forming Process

Regarding the coated and plated steel sheet having been subjected to the test for evaluation of formability, blackening resistance was evaluated. The test method and evaluation criteria thereof was the same as those in the above-mentioned "(6-4) Evaluation of blackening resistance (1)"

(6-8) Storage Stability

The aqueous surface treatment agents obtained in Examples and Comparative Examples were statically left for one month in a thermostat at 40° C. Thereafter, the viscosity of the aqueous surface treatment agent was examined and evaluated in the following evaluation criteria. Note that, in the test, the aqueous surface treatment agent for the coated and plated steel sheet ranked as 3 is judged to show practically sufficient storage stability.
3: Change in viscosity of the aqueous surface treatment agent is not observed
2: The aqueous surface treatment agent is thickened
1: The aqueous surface treatment agent is turned into a gel.

Tables 13 and 14 show the above evaluation results.

As shown in Tables 13 and 14, the coated and plated steel sheet in each of Examples 1 to 41 shows excellent corrosion resistance, acid resistance, blackening resistance, and formability, and the aqueous surface treatment agent in each of Examples 1 to 41 shows excellent storage stability.

Out of these, the coated and plated steel sheet obtained in each of Examples 33 to 41 includes both of the base coating sheet and the composite coating film, and therefore shows further excellent corrosion resistance and blackening resistance.

On the other hand, in Comparative Examples 1 to 5, the coated and plated steel sheet having each the sufficient corrosion resistance, acid resistance, blackening resistance, and formability was not obtained.

TABLE 13

| | | Evaluation of corrosion resistance | | Evaluation of acid resistance | Evaluation of blackening resistance | | Formability | Evaluation of blackening resistance after forming process | Storage stability |
|---|---|---|---|---|---|---|---|---|---|
| | | (1) | (2) | | (1) | (2) | | | |
| Examples | 1 | 4 | 3 | 4 | 3 | 2 | 4 | 3 | 3 |
| | 2 | 4 | 3 | 4 | 3 | 2 | 4 | 3 | 3 |
| | 3 | 4 | 3 | 4 | 3 | 2 | 4 | 3 | 3 |
| | 4 | 4 | 3 | 4 | 3 | 2 | 4 | 3 | 3 |
| | 5 | 3 | 2 | 3 | 3 | 2 | 3 | 3 | 3 |
| | 6 | 3 | 2 | 3 | 3 | 2 | 3 | 3 | 3 |
| | 7 | 3 | 2 | 3 | 3 | 2 | 3 | 3 | 3 |
| | 8 | 3 | 2 | 3 | 3 | 2 | 3 | 3 | 3 |
| | 9 | 3 | 2 | 3 | 3 | 2 | 3 | 3 | 3 |
| | 10 | 3 | 2 | 3 | 3 | 2 | 3 | 3 | 3 |
| | 11 | 3 | 2 | 3 | 3 | 2 | 3 | 3 | 3 |
| | 12 | 3 | 2 | 3 | 3 | 2 | 3 | 3 | 3 |
| | 13 | 3 | 2 | 3 | 3 | 2 | 3 | 3 | 3 |
| | 14 | 3 | 2 | 3 | 3 | 2 | 3 | 3 | 3 |
| | 15 | 3 | 2 | 3 | 3 | 2 | 3 | 3 | 3 |
| | 16 | 4 | 3 | 4 | 4 | 3 | 4 | 4 | 3 |
| | 17 | 4 | 3 | 4 | 4 | 3 | 4 | 4 | 3 |
| | 18 | 4 | 3 | 4 | 4 | 3 | 4 | 4 | 3 |
| | 19 | 3 | 2 | 3 | 4 | 3 | 3 | 4 | 3 |
| | 20 | 4 | 3 | 3 | 4 | 3 | 3 | 4 | 3 |
| | 21 | 4 | 3 | 4 | 4 | 3 | 4 | 4 | 3 |
| | 22 | 4 | 3 | 4 | 4 | 3 | 4 | 4 | 3 |
| | 23 | 4 | 3 | 4 | 4 | 3 | 4 | 4 | 3 |

TABLE 14

| | | Evaluation of corrosion resistance | | Evaluation of acid resistance | Evaluation of blackening resistance | | Formability | Evaluation of blackening resistance after forming process | Storage stability |
|---|---|---|---|---|---|---|---|---|---|
| | | (1) | (2) | | (1) | (2) | | | |
| Examples | 24 | 3 | 2 | 3 | 4 | 3 | 3 | 4 | 3 |
| | 25 | 4 | 3 | 4 | 4 | 3 | 4 | 4 | 3 |
| | 26 | 4 | 3 | 4 | 4 | 3 | 4 | 4 | 3 |
| | 27 | 4 | 3 | 4 | 4 | 3 | 4 | 4 | 3 |
| | 28 | 4 | 3 | 4 | 4 | 3 | 4 | 4 | 3 |
| | 29 | 4 | 3 | 4 | 4 | 3 | 4 | 4 | 3 |
| | 30 | 5 | 4 | 4 | 4 | 3 | 4 | 4 | 3 |
| | 31 | 4 | 3 | 4 | 4 | 3 | 4 | 4 | 3 |
| | 32 | 4 | 3 | 4 | 4 | 3 | 4 | 4 | 3 |
| | 33 | 5 | 5 | 4 | 5 | 5 | 4 | 4 | 3 |
| | 34 | 5 | 4 | 4 | 4 | 4 | 4 | 4 | 3 |
| | 35 | 5 | 4 | 4 | 4 | 4 | 4 | 4 | 3 |
| | 36 | 5 | 5 | 4 | 5 | 5 | 4 | 4 | 3 |
| | 37 | 5 | 5 | 4 | 5 | 5 | 4 | 4 | 3 |
| | 38 | 5 | 4 | 4 | 4 | 4 | 4 | 4 | 3 |
| | 39 | 5 | 5 | 4 | 5 | 5 | 4 | 4 | 3 |
| | 40 | 5 | 5 | 4 | 5 | 5 | 4 | 4 | 3 |
| | 41 | 5 | 5 | 4 | 5 | 5 | 4 | 4 | 3 |
| Comparative Examples | 1 | 2 | 1 | 1 | 1 | 1 | 2 | 1 | 3 |
| | 2 | 1 | 1 | 1 | 2 | 1 | 1 | 1 | 3 |
| | 3 | 2 | 1 | 2 | 3 | 1 | 1 | 3 | 2 |
| | 4 | 2 | 1 | 1 | 2 | 1 | 1 | 2 | 3 |
| | 5 | 3 | 3 | 2 | 1 | 1 | 2 | 1 | 3 |

INDUSTRIAL APPLICABILITY

The application of the surface-coated aluminum and zinc plated steel sheet in accordance with the present invention is not limited, but the surface-coated aluminum and zinc plated steel sheet may be used in a field of building materials, household appliances, and automobile members. In particular, the surface-coated aluminum and zinc plated steel sheet is preferably applied to building materials that are used for a long time outdoors.

The invention claimed is:

1. A surface-coated aluminum-zinc alloy plated steel sheet, comprising:
 an aluminum-zinc alloy plated steel sheet including a steel sheet and a plating layer containing a set of zinc and aluminum or a set of zinc, aluminum and magnesium on the steel sheet; and
 a base coating film formed by applying an aqueous surface conditioner onto the aluminum-zinc alloy plated steel sheet, the aqueous surface conditioner containing:
a basic zirconium compound (C);
a cobalt compound (D); and
water,
the aqueous surface conditioner having a pH within a range of 7.5 to 10,
the base coating film containing the basic zirconium compound (C) and the cobalt compound (D),
a dry mass of the base coating film per one surface of the aluminum-zinc alloy plated steel sheet falling within a range of 0.05 to 0.8 g/m$^2$,
a Zr mass conversion attached amount of the base coating film per one surface of the aluminum-zinc alloy plated steel sheet falling within a range of 5 to 400 mg/m$^2$,
a Co mass conversion attached amount of the base coating film per one surface of the aluminum-zinc alloy plated steel sheet falling within a range of 1 to 20 mg/m$^2$,
the surface-coated aluminum-zinc alloy plated steel sheet further comprising
a composite coating film formed by applying an aqueous surface treatment agent on the base coating film on the aluminum-zinc alloy plated steel sheet and drying the aqueous surface treatment agent,
the aqueous surface treatment agent containing a water dispersible resin (A), a cobalt compound (B), and water, and having a pH within a range of 7.5 to 10,
the composite coating film containing the water dispersible resin (A) and the cobalt compound (B),
a percentage by mass of the water dispersible resin (A) in the composite coating film being 90% or more, and
a mass of the composite coating film per one surface of the aluminum-zinc alloy plated steel sheet falling within a range of 0.5 to 3.5 g/m$^2$,
the water dispersible resin (A) contains at least one of
(aI) a polyester polyurethane resin having, in molecule, it structural unit derived from polyester polyol, and
(aII) an acrylic resin being a polymer having; a polymer unit derived from (meth)acrylic acid ester having an alicyclic structure or a glycidyl group; a polymer unit derived from α,β-ethylenically unsaturated carboxylic acid; and a polymer unit derived from (meth)acrylic acid ester not having an alicyclic structure and a glycidyl group.

2. The surface-coated aluminum-zinc alloy plated steel sheet as set forth in claim 1, wherein
cobalt constituting the cobalt compound (B) is contained in a mass ratio of 1/100 to 1/10000 based on the water dispersible resin (A).

3. The surface-coated aluminum-zinc alloy plated steel sheet as set forth in claim 1, wherein
the cobalt compound (B) includes at least one type of cobalt salts selected from a group consisting of cobalt sulfate, cobalt chloride, and cobalt nitrate.

4. The surface-coated aluminum-zinc alloy plated steel sheet as set forth in claim 1, wherein
an aluminum content of the plating layer falls within a range of 1 to 75 mass %, and
a magnesium content of the plating layer is more than 0 mass % but is not more than 6.0 mass %.

5. The surface-coated aluminum-zinc alloy plated steel sheet as set forth in claim 4, wherein
the plating layer contains at least one type of:
more than 0 mass % but not more than 1 mass % Ni; and
more than 0 mass % but not more than 1 mass % Cr.

6. The surface-coated aluminum-zinc alloy plated steel sheet as set forth in claim 4, wherein
the plating layer contains at least one type of:
more than 0 mass % but not more than 0.5 mass % Ca;
more than 0 mass % but not more than 0.5 mass % Sr;
more than 0 mass % but not more than 0.5 mass % Y;
more than 0 mass % but not more than 0.5 mass % La; and
more than 0 mass % but not more than 0.5 mass % Ce.

7. The surface-coated aluminum-zinc alloy plated steel sheet as set forth in claim 4, wherein
the plating layer contains Si in a range of 0.1 to 10 mass % based on Al of the plating layer.

8. A method of preparing a surface-coated aluminum-zinc alloy plated steel sheet, comprising:
preparing an aluminum-zinc alloy plated steel sheet and an aqueous surface conditioner having a pH within a range of 7.5 to 10 and containing a basic zirconium compound (C), a cobalt compound (D), and water;
applying the aqueous surface conditioner onto the aluminum-zinc alloy plated steel sheet to form a base coating film containing the basic zirconium compound (C) and the cobalt compound (D) so that a dry mass of the base coating film per one surface of the aluminum-zinc alloy plated steel sheet falls within a range of 0.05 to 0.8 g/m$^2$, a Zr mass conversion attached amount of the base coating film per one surface of the aluminum-zinc alloy plated steel sheet falls within a range of 5 to 400 mg/m$^2$, and a Co mass conversion attached amount of the base coating film per one surface of the aluminum-zinc alloy plated steel sheet falls within a range of 1 to 20 mg/m$^2$;
preparing an aqueous surface treatment agent, the aqueous surface treatment agent having a pH within a range of 7.5 to 10 and containing a water dispersible resin (A), a cobalt compound (B), and water,
the water dispersible resin (A) contains at least one of
(aI) a polyester polyurethane resin having, in molecule, a structural unit derived from polyester polyol, and
(aII) an acrylic resin being a polymer having; a polymer unit derived from (meth)acrylic acid ester having an alicyclic structure or a glycidyl group; a polymer unit derived from α, β-ethylenically unsaturated carboxylic acid; and a polymer unit derived from (meth)acrylic acid ester not having an alicyclic structure and a glycidyl group; and
applying the aqueous surface treatment agent onto the base coating film on the aluminum-zinc alloy plated steel sheet and drying the aqueous surface treatment to form a composite coating film in which a percentage by mass of the water dispersible resin (A) is 90% or more so that a mass of the composite coating film per one surface of the aluminum-zinc alloy plated steel sheet falls within a range of 0.5 to 3.5 g/m$^2$.

* * * * *